United States Patent
Bansal et al.

(10) Patent No.: US 9,438,673 B2
(45) Date of Patent: Sep. 6, 2016

(54) DYNAMIC UPDATE STREAMS FOR REAL TIME PROVISIONING

(71) Applicant: Microsoft Technology Licensing, LLC, Redmond, WA (US)

(72) Inventors: Vipul Bansal, Sammamish, WA (US); Marcus Vinicius Silva Gois, Bothell, WA (US); Mark Coburn, Bothell, WA (US); Suraj Gaurav, Issaquah, WA (US); Swaminathan Pattabiraman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 14/332,509

(22) Filed: Jul. 16, 2014

(65) Prior Publication Data

US 2016/0021182 A1    Jan. 21, 2016

(51) Int. Cl.
  *G06F 15/16* (2006.01)
  *H04L 29/08* (2006.01)
  *G06F 9/50* (2006.01)

(52) U.S. Cl.
  CPC ......... *H04L 67/1095* (2013.01); *G06F 9/5027* (2013.01); *H04L 67/16* (2013.01); *G06F 2209/5017* (2013.01)

(58) Field of Classification Search
  CPC . H04L 67/1095; H04L 67/16; G06F 9/5027; G06F 2209/5017
  See application file for complete search history.

(56) References Cited

U.S. PATENT DOCUMENTS

| | | | |
|---|---|---|---|
| 8,122,055 B2 | 2/2012 | Grewal et al. | |
| 8,473,469 B1 | 6/2013 | Yancey et al. | |
| 2011/0213870 A1 | 9/2011 | Cai et al. | |
| 2011/0258614 A1* | 10/2011 | Tamm | G06F 11/3644 717/129 |
| 2011/0289508 A1 | 11/2011 | Fell et al. | |
| 2013/0031053 A1 | 1/2013 | Tobin et al. | |
| 2013/0238641 A1* | 9/2013 | Mandelstein | G06F 17/303 707/756 |
| 2013/0339505 A1 | 12/2013 | Bansal et al. | |
| 2014/0068732 A1* | 3/2014 | Hinton | G06F 21/41 726/6 |

OTHER PUBLICATIONS

International Search Report and Written Opinion for International Application No. PCT/US2015/040084, date of mailing: Nov. 19, 2015, date of filing: Jul. 13, 2015, 14 pages.
Zwet, Jelle Frank Van Der, "A Practical Guide to Cloud Onboarding", In Interxion White Paper Retrieved on: May 7, 2014, pp. 1-16.
Bobrowski, Steve, "The Force.com Multitenant Architecture". Retrieved on: May 7, 2014 Available at: https://developer.salesforce.com/page/Multi_Tenant_Architecture.
"Partitioning Multi-Tenant Applications", Published on: Dec. 16, 2012 Available at: http://msdn.microsoft.com/en-us/library/hh534477.aspx.
Second Written Opinion for International Patent Application No. PCT/US2015/040084, date of mailing: Jun. 8, 2016, date of filing: Jul. 13, 2015, 9 pages.

* cited by examiner

*Primary Examiner* — Krisna Lim
(74) *Attorney, Agent, or Firm* — Damon Rieth; Tom Wong; Micky Minhas

(57) ABSTRACT

Tenant changes are received at a multi-tenant service. The tenant changes are segmented, by tenant, and individual update streams are established with individual tenant stream processors. Each tenant stream processor makes changes for a given tenant, until the changes for that tenant are completed.

20 Claims, 8 Drawing Sheets

DYNAMIC UPDATE STREAMS FOR REAL TIME PROVISIONING

BACKGROUND

Computer systems are currently in wide use. Some computer systems are local computer systems, while others are used in a remote server environment.

It is not uncommon for a company or another organization to switch between a local (on-premise) implementation of a computer system to a remote server implementation (such as a cloud-based implementation) of the computer system. By way of example, companies sometimes switch between a local implementation and a remote server implementation of their electronic mail systems, their document sharing systems, or their business systems. Some examples of business systems include enterprise resource planning (ERP) systems, customer relations management (CRM) systems, line-of-business (LOB) systems, among others. These are only some examples of the types of computer systems where companies switch between a local, on-premise, implementation to a remote server or cloud-based implementation.

Similarly, some organizations have a hybrid implementation. In such an implementation, some of the services are performed by local, on-premise, components of the computer system, while other services are performed in the remote server or cloud-based environment. In hybrid systems, it is not uncommon for the organization to periodically migrate certain services from the on-premise implementation to the cloud-based implementation, while maintaining other services on-premise.

Some companies that have remote server or cloud-based implementations, or hybrid implementations, are relatively large. Enterprise organizations, for example, may have many thousands of employees. Thus, the remote server or cloud-based implementation of their computer system must serve a large number of individuals. Many of the transactions or changes made to the computer system involve making changes to a large number of user accounts or user data.

By way of example, when an enterprise organization wishes to migrate some computing system functionality from an on-premise implementation to a cloud-based implementation, this can involve many different updates to the computer system for the enterprise. As a specific example, if the enterprise is migrating its electronic mail system, this can involve the creation of a large number of employee accounts. Account creation is often done in a serialized manner, which can take a large amount of time. In addition, where a large number of changes are made, those changes can consume a large amount of the processing and memory overhead and bandwidth of the remote server or cloud-based implementation.

Many cloud-based or remote server implementations are also multi-tenant systems. That is, they provide some level of service for multiple different tenants, who are often multiple different organizations. When one tenant makes a large number of changes, this can negatively affect the performance experienced by the other tenants.

The discussion above is merely provided for general background information and is not intended to be used as an aid in determining the scope of the claimed subject matter.

SUMMARY

Tenant changes are received at a multi-tenant service. The tenant changes are segmented, by tenant, and individual update streams are established with individual tenant stream processors. Each tenant stream processor makes changes for a given tenant, until the changes for that tenant are completed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
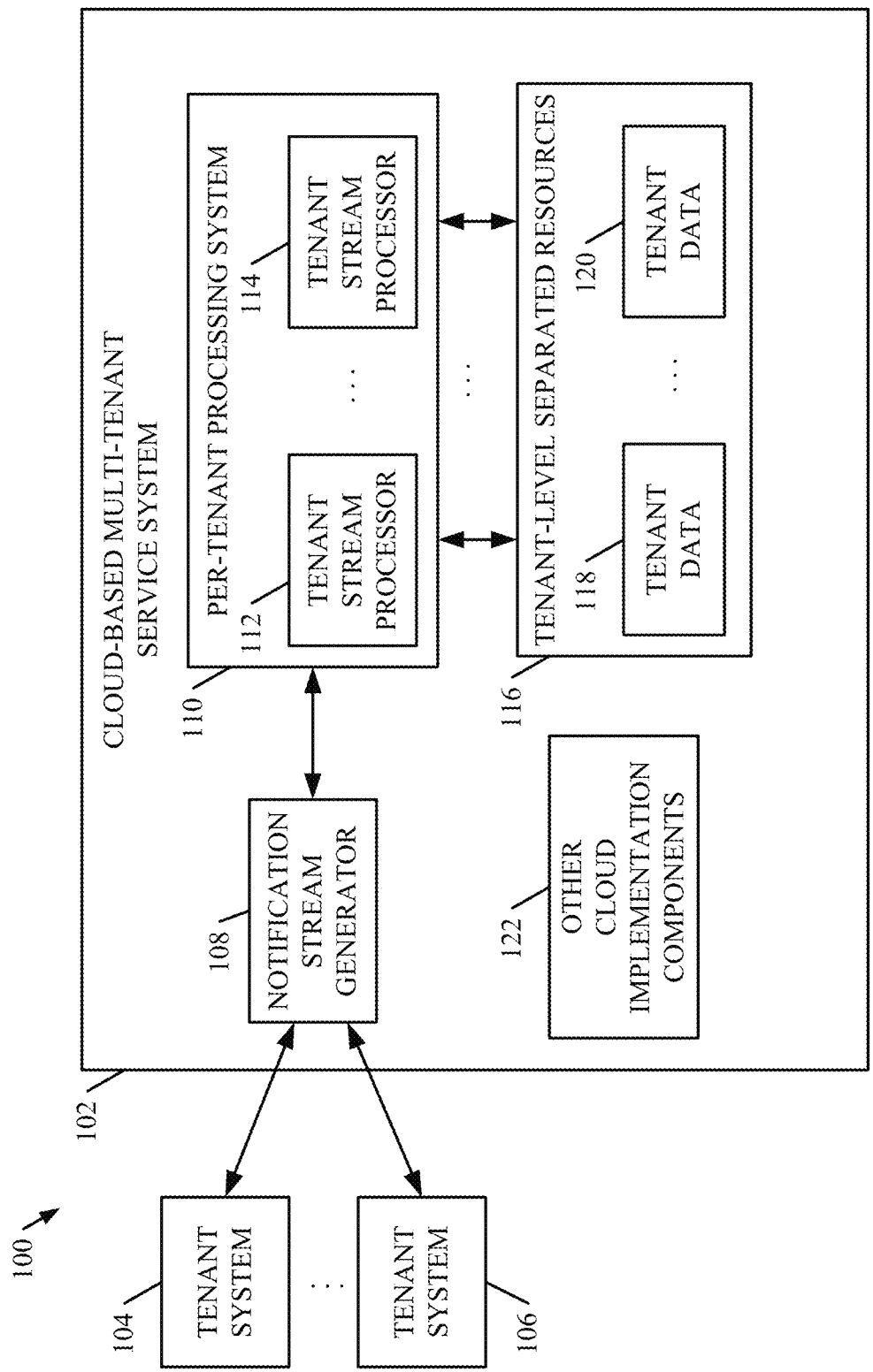
FIG. 1 is a block diagram of one example of a cloud-based, multi-tenant service architecture.

FIG. 1 is a block diagram of one example of a cloud-based multi-tenant service architecture 100. Architecture 100 includes cloud-based multi-tenant service system 102 that is accessible by a plurality of different tenant systems 104-106. As is described in greater detail below with respect to FIG. 4, cloud-based multi-tenant service system 102 provides some level of multi-tenant services to tenants that use tenant systems 104-106. The tenants are illustratively separate organizations so that the multi-tenant services provided by system 102 are separated or isolated per tenant, at the desired level. Also, as is described in greater detail below with respect to FIG. 4, the multi-tenant services can be provided at the infrastructure level, at the application platform level, or at the application software level, among others. Thus, depending on the particular level of multi-tenancy that is provided by system 102, the information corresponding to a particular client will be separated at that level, and isolated so it cannot be accessed by other tenants.

By way of example, if system 102 provides infrastructure as a service (IaaS), then the infrastructure components of system 102 are shared by tenants 104-106, but the tenant information is kept separate otherwise. If system 102 provides a platform as a service (PaaS), then the platform components are shared by tenants 104-106. If system 102 provides application software as a service (SaaS), then a common application is run by system 102, to service tenants 104-106. In any of these implementations, because system 102 provides some level of multi-tenancy, the information corresponding to the different tenants 104-106 is kept separate. This is described in greater detail below with respect to FIG. 4.

The example of system 102 shown in FIG. 1 includes notification stream generator 108, per-tenant processing system 110 which, itself, includes tenant stream processors 112-114, tenant-level separated resources 116 and a variety of other cloud implementation components 124 discussed in more detail below with respect to FIG. 4. In the example shown in FIG. 1, the tenant-level separated resources include tenant data 118-120, which represents the information corresponding to each tenant system 104-106, respectively, that is kept separate from, and inaccessible by the other tenants.

Tenant systems 104-106 illustratively provide changes to cloud-based multi-tenant service system 102. For instance, tenant system 104 may be migrating its electronic mail service from an on-premise implementation to a cloud-based implementation in system 102. In that case, tenant system 104 provides changes to migrate its entire electronic mail system from the on-premise version to system 102. In another example, tenant system 106 may have acquired another organization and therefore may need to add a large number of electronic mail accounts to its cloud-based implementation in system 102. In yet another example, the organization that uses tenant system 104 may have reorganized. Therefore, it may need to change a large number of employee records to show that they are no longer part of the human resources department, but are now part of the marketing department. In any of these examples, or a wide variety of other examples, the changes to the cloud-based implementation for the tenants may be relatively large in number. However, system 102 processes these changes in a way that they will not affect the performance of system 102 in servicing the other tenants.

A more detailed description of the operation of system 102 in making tenant updates is provided below with respect to FIGS. 2 and 3. A brief overview will now be provided to enhance understanding. It is first assumed that one of tenants 104-106 provides a request for tenant changes to system 102. The tenant changes indicate requested changes to the tenant data 118-120 corresponding to the requesting tenant. Notification stream generator 108 creates per-tenant synchronization streams with per-tenant processing system 110. In one example, it groups the changes received by tenants 104-106 into per-tenant segments. It then hands a bookmark corresponding to a given segment to one of tenant stream processors 112-114. Tenant stream processors 112-114 are illustratively different servers, or at least different server instances. The tenant stream processor that received the bookmark then maintains a communication link (the synchronization stream) with notification stream generator 108 and obtains and makes the tenant changes, over the synchronization stream and using the bookmark where needed, to the corresponding tenant data. The same tenant stream processor 112 continues making changes for the same tenant, until those tenant changes are drained from notification stream generator 108. It then indicates to notification stream generator 108 that is has completed making the changes. If, while the tenant stream processor is making changes for the given tenant, a second tenant provides change requests to notification stream generator 108, generator 108 establishes another synchronization stream with a second tenant stream processor in system 110. The second stream processor 110 continues to make changes for the second tenant, until those changes have been drained. This continues for each different tenant that requests changes so that each tenant has its own processing stream (or synchronization stream) with a designated server, for making changes. The server enforces its own workload constraints, at the server level. In this way, regardless of the number of changes requested by any given tenant, the performance of system 102 experienced by the other tenants will not be effected.

Figure 2:
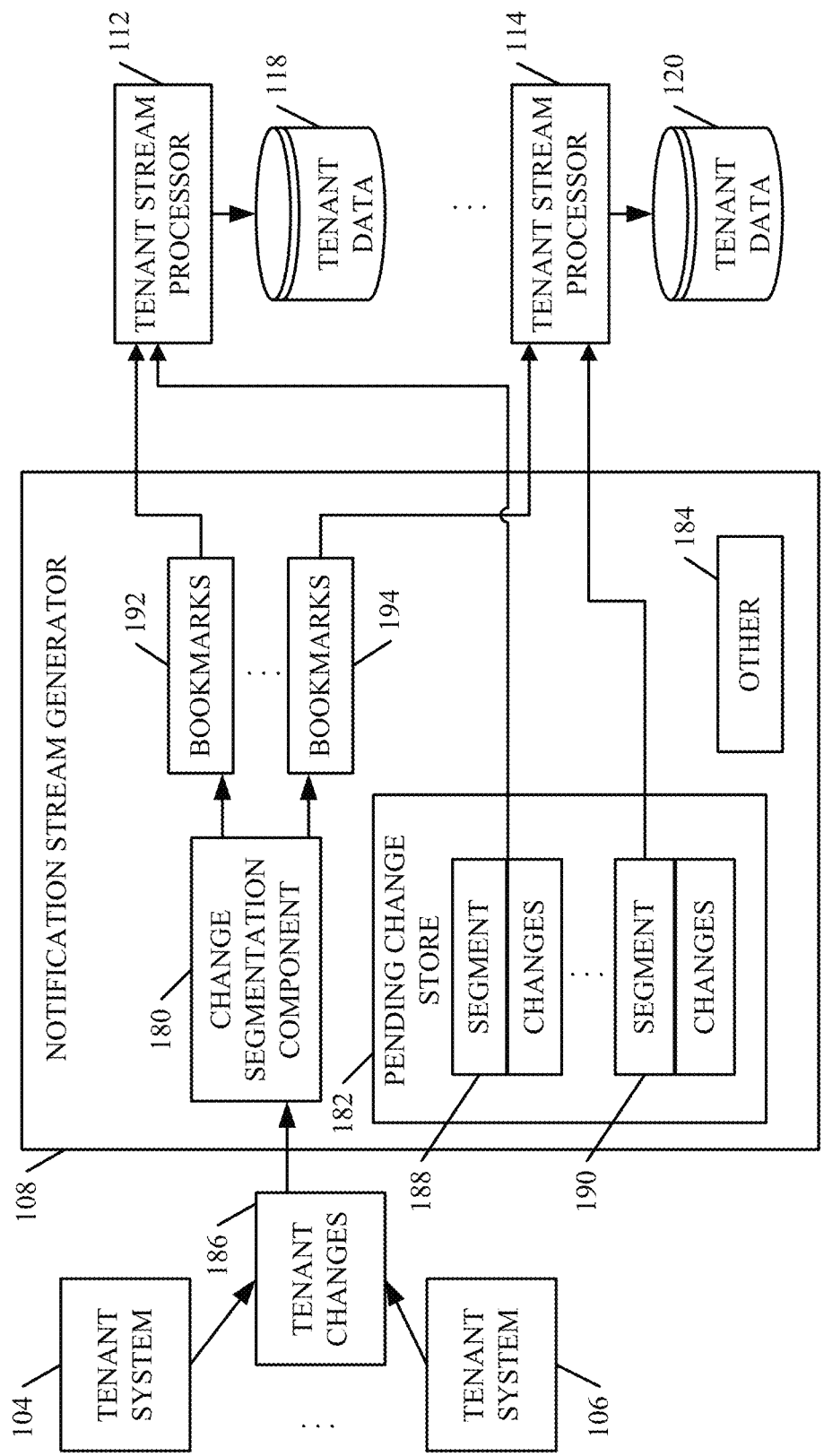
FIG. 2 is a block diagram showing one example of a notification stream generator in more detail.

FIG. 2 is a block diagram of one example of notification stream generator 108 in more detail. Generator 108 illustratively includes change segmentation component 180, pending change store 182, and it can include other items 184 as well. FIG. 3 also shows that generator 108 illustratively receives tenant changes 186 from tenants 104-106 and segments them into segments 188-190. Each segment 188-190 represents the changes for a different tenant 104-106. FIG. 3 also shows that change segmentation component 180, once it has segmented the tenant changes 106, sends bookmarks 192-194, corresponding to the different segments 188-190, to different tenant stream processors 112-114. The tenant stream processors 112-114 obtain the changes from store 182 and then make the changes to corresponding tenant data 118-120, for the corresponding tenant. The tenant stream processors 112-114 use bookmarks 192-194 to ensure that the tenant changes in the corresponding segments 188-190 are all made. Thus, each tenant stream processor 112-114 has a synchronization stream to obtain a set of changes for one tenant, exclusively, and receives the changes for that tenant only, over the synchronization stream, and makes all the changes for the same tenant until all the changes for that tenant are drained from the corresponding segment. It then returns the bookmark to change segmentation component 180 indicating that the tenant stream processor is free to make changes for a different tenant.

Figure 3:
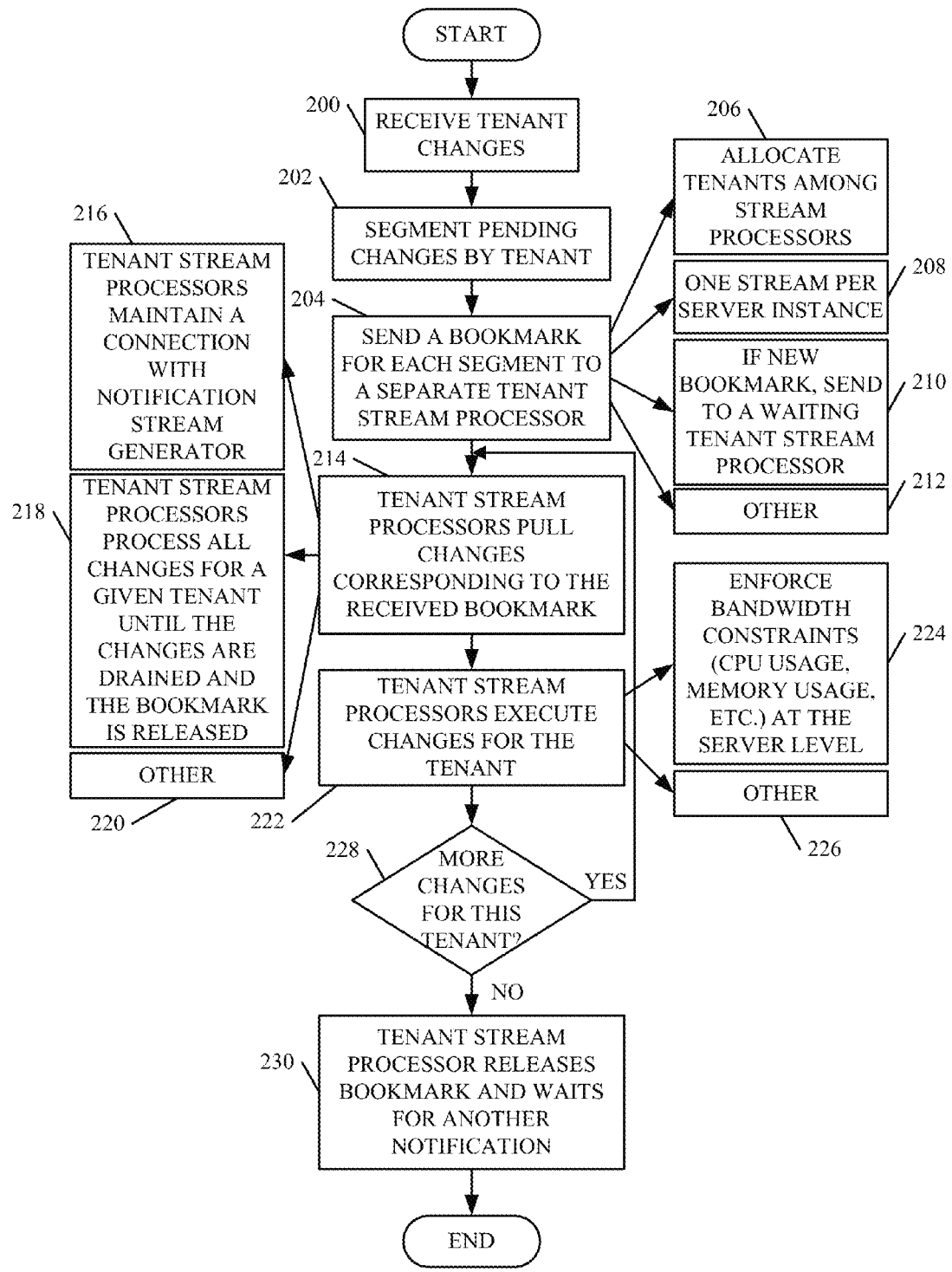
FIG. 3 is a flow diagram illustrating one example of the operation of the architecture shown in FIG. 1.

FIG. 3 is a flow diagram illustrating one example of the operation of notification stream generator 108 and cloud-based multi-tenant service system 102, in making the tenant changes 186 to the tenant data in the cloud-based system 102. Change segmentation component 180 first receives tenant changes 186 from one or more tenant systems 104-106. This is indicated by block 200 in FIG. 4. Component 180 then segments the changes 186 into different segments 188-190. Segments 188-190 are illustratively per-tenant segments so that each segment 188-190 contains all of the tenant changes submitted by the same tenant, and those changes only. Segmenting the pending changes on a per-tenant basis is indicated by block 202 in FIG. 4.

Change segmentation component 180 then assigns a tenant stream processor 112-114 to each of the segments so that the same processor can process all of the changes for a given tenant. In the example described herein, each tenant stream processor 112 is a separate server, or at least a separate instance of a server. Thus, each tenant has a dedicated server or server instance to make its requested changes.

In the example shown in FIG. 3, change segmentation component 180 assigns a tenant stream processor 112-114 to each tenant by sending it a corresponding bookmark 192-194, that corresponds to a segment 188-190. Sending the bookmark is indicated by block 204 in FIG. 4. It will be noted that, where two or more tenants are relatively small tenants, they may be connected to the same tenant stream processor 112-114. In that case, the tenant workloads will be allocated among various tenant stream processors 112-114, but there may not necessarily be a one-to-one correspondence between a tenant and a server (or tenant stream processor). Allocating the tenants among the tenant stream processors is indicated by block 206 in FIG. 4.

As described above, however, in one example, there is one tenant stream (along which the tenant stream processor receives and makes the tenant changes, for one tenant, exclusively) per server instance). This is indicated by block 208. The stream is maintained until all changes in the segment are made.

Notifying the tenant stream processor of tenant changes that need to be made can be done in a variety of different ways. For instance, if the changes correspond to a new segment in pending change store 182, then component 180 sends a new bookmark, corresponding to the new segment, to a tenant stream processor that is waiting to make changes (e.g., one that is not already assigned to another tenant or tenant stream). This is indicated by block 210. Of course, change segmentation component 180 can notify the tenant stream processors of pending changes in other ways as well, and this is indicated by block 212.

Once a tenant stream processor (e.g., processor 112) has been notified that it is to make changes from one of the segments 188-190 (e.g., segment 188), it pulls the tenant changes from the corresponding segment. This is indicated by block 214 in FIG. 4. In doing so, the tenant stream processor 112 illustratively maintains a connection with notification stream generator 108 until all changes from segment 188 have been obtained and made. This can be done using hypertext transfer protocol (HTTP) long polling, or by using another constant connection mechanism. Maintaining the connection is indicated by block 216. The tenant stream processor 112 processes all of the tenant changes for a given tenant until the changes are drained from the corresponding segment, and the bookmark is released by the tenant stream processor 112. This is indicated by block 218 in FIG. 4. The tenant stream processors can pull the changes and make them in other ways as well, and this indicated by block 220.

As the tenant stream processors pull the changes from the corresponding segment, they execute those changes in the corresponding tenant data, for the given tenant. This is indicated by block 222. Because each tenant stream processor corresponds to a server instance, it is the server instance, itself, that enforces the bandwidth constraints on the tenant changes. For instance, the server instance, itself, enforces constraints on CPU usage, memory usage, bandwidth usage, etc. Since each tenant 104-106 has its own server instance for making changes, no tenant 104-106 can exceed the usage constraints imposed by its corresponding server instance (e.g., its assigned tenant stream processor). This is indicated by block 224 in FIG. 4. In this way, no particular tenant 104-106 can overwhelm the functionality of the cloud implementation, to the detriment of other tenants. Since the tenant stream processor (or server instance) is not, at the same time, attempting to process changes from other tenants (it is processing changes for exclusively one tenant at a time), the workload of any given tenant 104-106 does not affect the performance provided to other tenants of the cloud-based implementation. Instead, each tenant receives the same treatment, in terms of performance, because each tenant has its own server instance (or tenant stream processor) making its changes. It will be noted that the tenant stream processors can execute the changes for tenants in other ways as well, and this is indicated by block 226.

Also, scaling is readily enabled. By adding new machines or server instances, the capacity to service tenants increases directly and promptly. The new machines or server instances are added to the available stream processors that can be used to process changes.

Each tenant stream processor 112-114, after it makes a set of changes, determines whether there are any more changes for this tenant in the corresponding segment. This is indicated by block 228 in FIG. 4. If so, processing reverts to block 214 where the tenant stream processor pulls those changes from the corresponding segment and commits them to the tenant data.

However, if, at block 228, it is determined that there are no further changes for this tenant in the corresponding segment, then the tenant stream processor indicates to notification stream generator 108 that it has completed its tenant changes and waits for another notification to commit changes for the same or a different tenant. In one embodiment, the tenant stream processor 112-114 can do this by releasing or returning the bookmark to notification stream generator 108. This is indicated by block 230 in the flow diagram of FIG. 4.

It can thus be seen that notification stream generator 108 can generate a synchronization stream (or tenant stream) on a per-tenant basis. It provides a way for scaling out on-boarding activities (such as adding new users to the cloud-based system) and other activities. The system can scale to meet the needs of a great many tenants because that is limited only by the number of servers or server instances that can process separate tenant streams. The streams are executed independently by different servers or server instances, so additional servers or server instances can be invoked, as needed for additional tenant streams. This allows the on-boarding activities for different tenants to be spread across different machines.

The notification stream generator 108 enables the system to scale dynamically by only notifying tenant stream processors when a tenant has changes. At any given point in time, this is normally a small set of tenants in comparison to the entire set of tenants that access the cloud-based system. This reduces overall latency because each tenant stream processor processes changes as they are received and made available. Also, it promotes automatic scaling, because as soon as any new servers or server instances go online, they can be used by the notification stream generator 108 to make tenant changes. This amounts to a large number of individual, per-tenant, data pipes instead of one fat pipe where a single tenant can overwhelm the system causing other tenants to experience reduced performance. No single server or server instance acts as a bottleneck or point of failure. In addition, notification stream generator 108 notifies the tenant stream processors 112-114 that changes are to be made, without enumerating every single object change. Instead, it groups the changes into segments on a per-tenant basis. This also improves performance.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
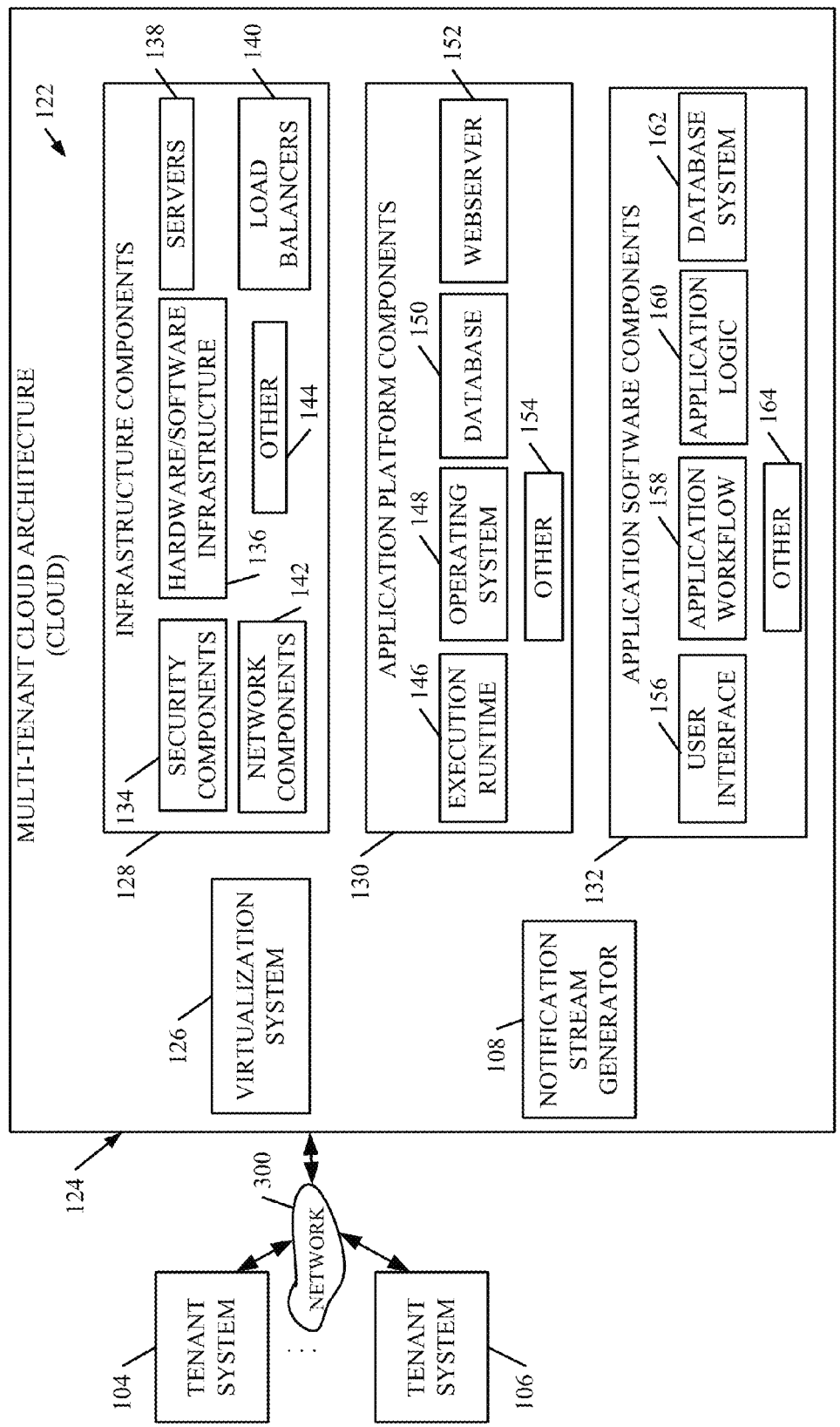
FIG. 4 is a block diagram illustrating different levels of multi-tenancy in one example of a multi-tenant cloud architecture.

FIG. 4 is a block diagram showing a more detailed embodiment of a multi-tenant cloud architecture 124 (cloud 124) in which system 102 can be implemented. FIG. 4 shows one example of the other cloud implementation components 122 (shown in FIG. 1) in more detail.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 4 shows that components 122 in system 102 illustratively include virtualization system 126, infrastructure components 128, application platform components 130, and application software components 132. Infrastructure components 128 can include security components 134, hardware/software infrastructure 136, servers 138, load balancing components 140, network components 142, and it can include other components 144 as well.

Application platform components 130 can include execution runtime components 146, operating system components 148, database components 150, web server components 152, and it can include other components 154 as well. Application software components 132 illustratively include user interface components 156, application workflows 158, application logic 160, database systems 162, and it can include other items 164.

Depending on the level of multi-tenancy implemented by architecture 124, virtualization system 126 will electronically separate the physical computing device components 122 into one or more virtual devices. Each of these devices can be used and managed to perform computing tasks.

Multi-tenant cloud computing architecture 124 can provide services at a number of different levels, according to a number of different models. They can include, for instance, infrastructure as a service (IaaS), platform as a service (PaaS) and software as a service (SaaS), among others. IaaS is the most basic and each of the higher level models (PaaS and SaaS, respectively) abstract from the details of the lower models.

In IaaS, physical or virtual machines are provided, along with other resources. A supervisory component (sometimes referred to as a hypervisor) runs the virtual machines. Multiple different hypervisors can be used to run a relatively large number of virtual machines and to scale up and down according to the needs of various tenants. The IaaS model can also offer additional resources (such as other infrastructure components 128) on-demand. In order for a tenant to deploy their applications, they install operating system images as well as their application software on the cloud infrastructure components 128. The tenant is then responsible for maintaining the operating systems and application software.

PaaS involves the cloud architecture 124 providing the application platform components 130 as a service. Application developers can develop and run their software on the cloud platform components 130 without needing to manage the underlying hardware and software layers.

SaaS involves architecture 124 providing access to application software and databases in application components 132. The cloud architecture 124 manages the infrastructure components 128 and the platform components 130 that run the applications. The cloud 124 also installs and operates the application software in application components 132 and tenants access the software but do not manage the cloud infrastructure components 128 or platform components 130 where the application runs. In such an implementation, virtualization system 126 provides multiple virtual machines at runtime to meet changing workloads. Load balancers distribute the work over the virtual machines. This process is often transparent to the tenant who sees only a single access point to the application.

In a multi-tenant environment, any machine can serve more than one user organization that deploys a tenant system 104-106. Multi-tenancy, however, can apply to all three layers of cloud architecture (IaaS, PaaS and SaaS). The exact degree of multi-tenancy may be based on how much of the core application (or application components 132) is designed to be shared across tenants 104-106. A relatively high degree of multi-tenancy allows the database schema to be shared and supports customization of the business logic, workflow and user interface layers. In a relatively low degree of multi-tenancy, the IaaS and PaaS components 128 and 130, respectively, are shared by the application components 132 that have dedicated virtualized components that are dedicated to each tenant.

The discussion above has proceeded with respect to the cloud-based multi-tenant service system 102 offering software as a service. Therefore, the virtualization system 126 will provide separate virtual machines to provide each tenant 104-106 with their own, secure and separate virtual computing environment on the application software level. Thus, each tenant 104-106 can make changes to their own application (such as their own electronic mail application, document management system, business system, etc.). When done as described above with respect to FIGS. 1-3, they can do so without affecting the performance observed by other tenants.

It is also contemplated that some elements of system 102 can be disposed in the cloud while others are not. By way of example, the databases and data stores can be disposed outside of cloud 124, and accessed through cloud 124. In another example, other components can be outside of cloud 124. Regardless of where they are located, they can be accessed directly by devices in tenant systems 104-106, through a network 300 (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
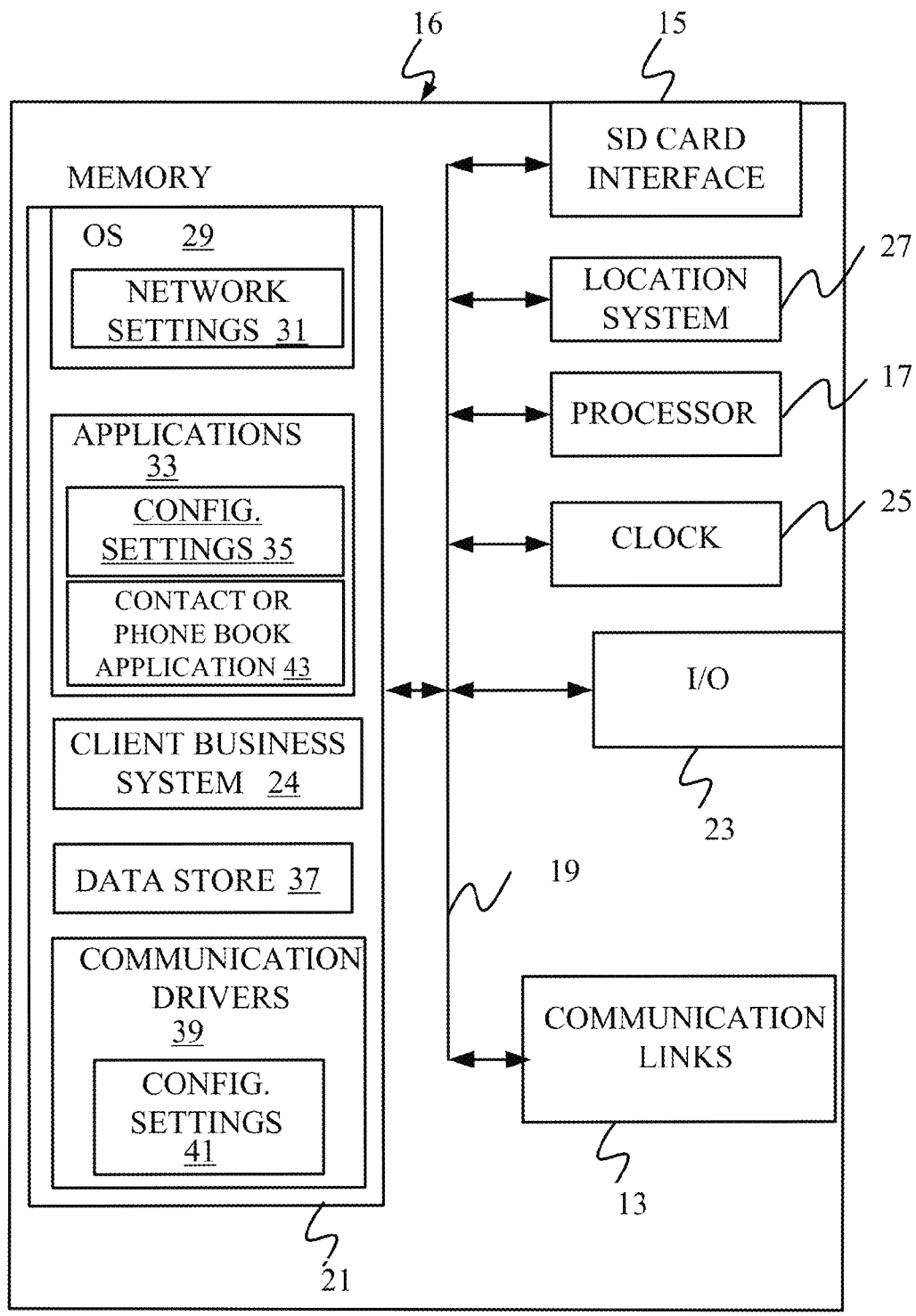
FIGS. 5-7 show examples of mobile devices.
Figure 6:
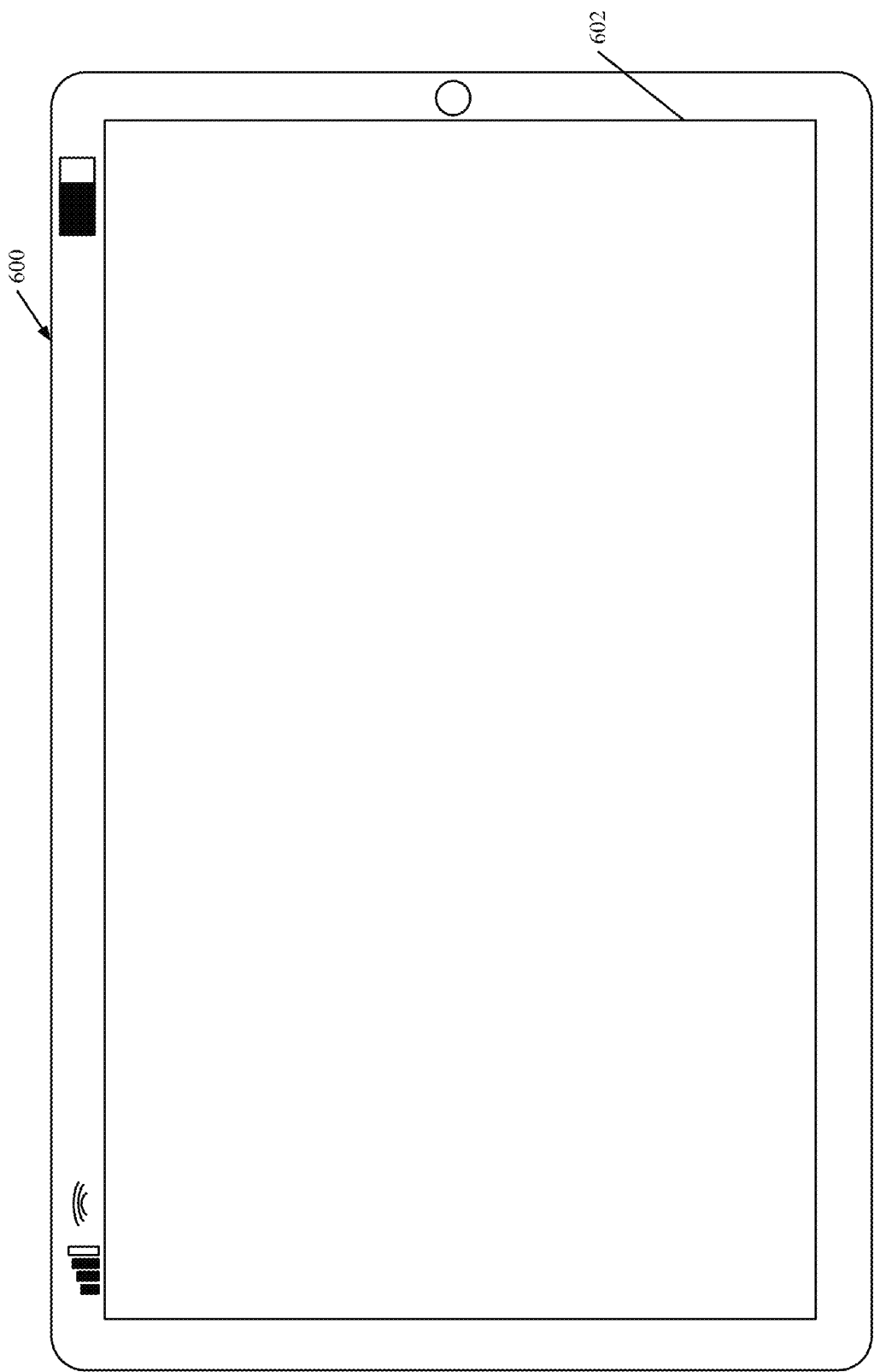
Figure 7:
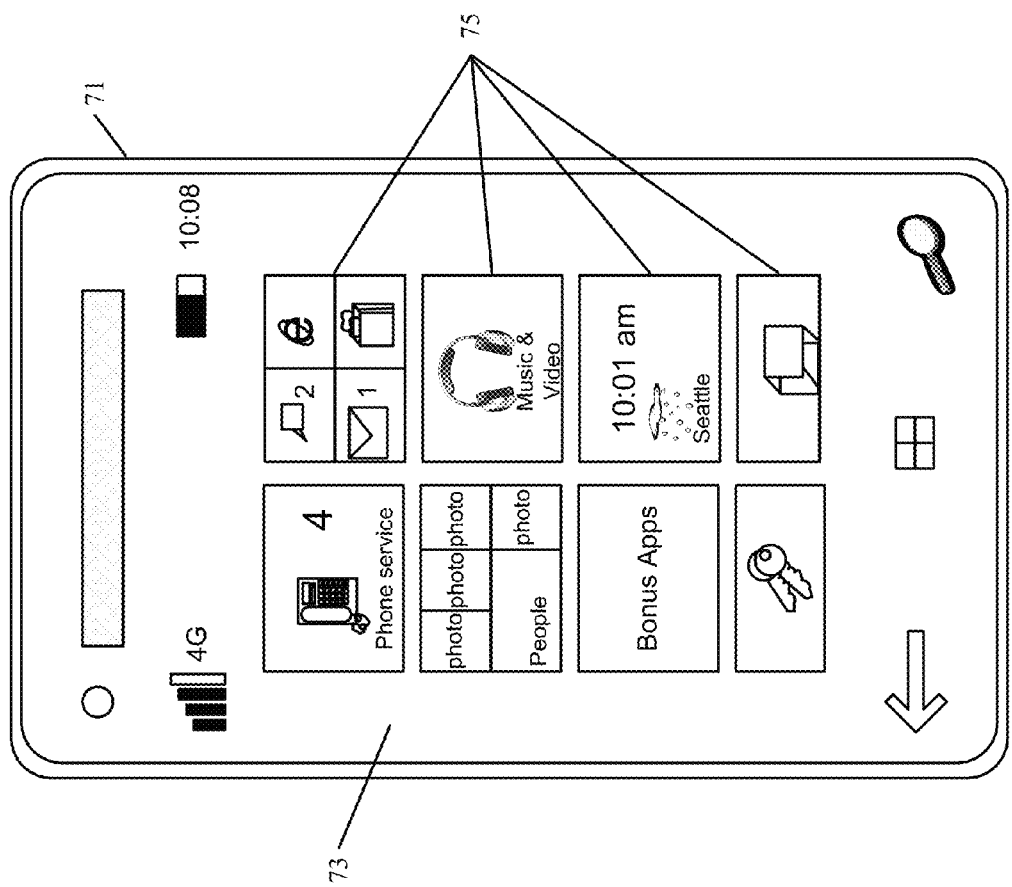

FIG. 5 is a simplified block diagram of one example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of system 100 or tenants 104-106 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors or servers described above in the other Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of tenant systems 104-106. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. They can include, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone also includes a Secure Digital (SD) card slot that accepts a SD card.

The mobile device can also be a personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
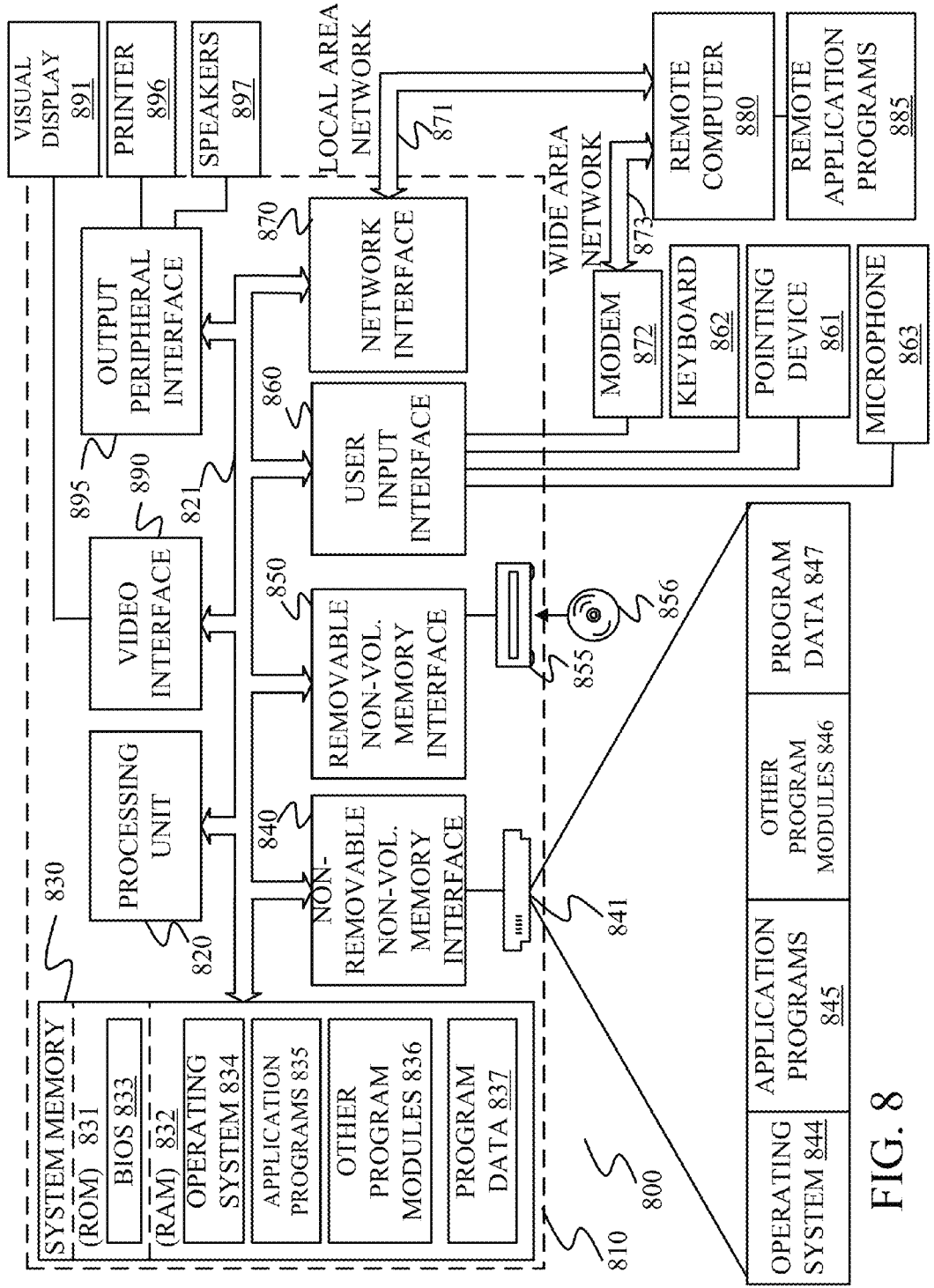
FIG. 8 is a block diagram of one example of a computing environment.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers discussed above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system, comprising:

a plurality of server instances, in a multi-tenant system, the server instances servicing a plurality of different tenants, each tenant corresponding to a different organization and having corresponding tenant data, serve r instances in the multi-tenant system isolating the tenant data corresponding to each tenant from other tenants; and a notification stream generator that receives a set of change requests from each of a plurality of different requesting tenants, each set of change requests being indicative of changes to the tenant data corresponding to the requesting tenant, the notification stream generator notifying a different server instance for each of the sets of change requests received from the requesting tenants, each notified server instance maintaining a connection with the notification stream generator until the notified server instance has performed all changes in the set of change requests for which it was notified and, thereafter, releasing the connection.

Example 2 is the computer system of any or all previous examples wherein the multi-tenant system is a cloud-based system.

Example 3 is the computer system of any or all previous examples wherein the notification stream generator comprises:

a change segmentation component that segments the sets of change requests into per-tenant segments.

Example 4 is the computer system of any or all previous examples wherein the notification stream generator comprises:

a pending change store, the change segmentation component segmenting the sets of change requests into the per-tenant segments in the pending change store.

Example 5 is the computer system of any or all previous examples wherein each of the notified server instances maintains the connection with the notification stream generator and pulls the changes from a given per-tenant segment, corresponding to the set of change requests for which it was notified, until all changes from the given per-tenant segment have been pulled.

Example 6 is the computer system of any or all previous examples wherein the notification stream generator notifies each given server instance by providing the given server instance with a bookmark corresponding to a per-tenant segment in the pending change store.

Example 7 is the computer system of any or all previous examples wherein the given server instance enforces resource usage constraints, in pulling and making the change requests, on an individual server instance basis.

Example 8 is the computer system of any or all previous examples wherein, for each additional set of change requests received from an additional requesting tenant, the notification stream generator notifies an additional server instance to process the additional set of change requests.

Example 9 is the computer system of any or all previous examples wherein each of the server instances comprises:

a server instance implemented on a separate physical server.

Example 10 is a computer system, comprising:

a multi-tenant system that serves a plurality of different tenants and maintains separate, isolated tenant data for each of the different tenants, the multi-tenant system comprising:

a plurality of different servers that process tenant changes in tenant data; and a notification stream generator that receives sets of tenant changes from corresponding, requesting tenants and assigns a server, of the plurality of different servers, to each requesting tenant to process the corresponding set of tenant changes, the server processing all tenant changes in the set of tenant changes for the corresponding tenant to which the server is assigned before the notification stream generator assigns the server to process tenant changes for another tenant.

Example 11 is the computer system of any or all previous examples wherein the plurality of different servers comprise a plurality of different server instances.

Example 12 is the computer system of any or all previous examples wherein the notification stream generator comprises:

a change segmentation component that segments the sets of tenant changes into segments, each segment corresponding to a requesting tenant.

Example 13 is the computer system of any or all previous examples wherein the server assigned to the requesting tenant pulls the tenant changes form the segment corresponding to the requesting tenant and makes the tenant changes in the tenant data corresponding to the requesting tenant, and notifies the notification stream generator when all the tenant changes from the segment have been made to the tenant data corresponding to the requesting tenant.

Example 14 is the computer system of any or all previous examples and further comprising:

a pending change store that stores the sets of tenant changes.

Example 15 is the computer system of any or all previous examples wherein the change segmentation component segments the sets of tenant changes in the pending change store.

Example 16 is the computer system of any or all previous examples wherein the multi-tenant system is implemented in a cloud computing architecture.

Example 17 is a method, comprising:

receiving, from a first tenant, a first set of tenant changes indicative of requested changes to first tenant data corresponding to the first tenant in a multi-tenant system;

receiving, from a second tenant, a second set of tenant changes indicative of requested changes to second tenant data corresponding to the second tenant in the multi-tenant system;

establishing a first exclusive synchronization stream for communication of the first set of tenant changes to a first server in the multi-tenant system, until the first server makes all of the requested changes in the first set of tenant changes, the exclusive synchronization stream being exclusive of synchronization streams that communicate other sets of tenant changes, other than the first set of tenant changes; and establishing a second exclusive synchronization stream for communication of the second set of tenant changes to a second server in the multi-tenant system, until the second server makes all of the requested changes in the second set of tenant changes, the exclusive synchronization stream being exclusive of synchronization streams that communicate other sets of tenant changes, other than the second set of tenant changes.

Example 18 is the method of any or all previous examples and further comprising:

storing, with a notification stream generator, the first set of tenant changes in a first segment in a pending changes data store, the first segment containing tenant changes for only the first tenant; and storing, with the notification stream generator, the second set of tenant changes in a second segment in the pending changes data store, the second segment containing tenant changes for only the second tenant.

Example 19 is the method of any or all previous examples wherein establishing the first exclusive synchronization stream comprises:

maintaining a first connection between the first server and the notification stream generator, until the first server makes all of the requested changes received from the first tenant, indicated by the first set of tenant changes, and thereafter, releasing the first server from the first connection so the first server can be notified of additional sets of tenant changes for other tenants.

Example 20 is the method of any or all previous examples wherein establishing the second exclusive synchronization stream comprises:

maintaining a second connection between the second server and the notification stream generator, until the second server makes all of the requested changes received from the second tenant, indicated by the second set of tenant changes, and thereafter, releasing the second server from the second connection so the second server can be notified of additional sets of tenant changes for other tenants.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
    a plurality of server instances, in a multi-tenant system, the server instances servicing a plurality of different tenants, each tenant corresponding to a different organization and having corresponding tenant data, the server instances in the multi-tenant system isolating the tenant data corresponding to each tenant from other tenants; and
    a notification stream generator configured to receive change requests from each of a plurality of different requesting tenants, the notification stream generator comprising a change segmentation component configured to segment the received change requests into per-tenant segments, each per-tenant segment corresponding to a particular one of the requesting tenants and comprising a set of change requests indicative of changes to the tenant data corresponding to the particular requesting tenant,
    wherein the notification stream generator is configured to notify a different server instance for each per-tenant segment, each notified server instance maintaining a connection with the notification stream generator until the notified server instance has performed all change requests in the per-tenant segment for which it was notified and, thereafter, releasing the connection.

2. The computer system of claim 1 wherein the multi-tenant system is a cloud-based system.

3. The computer system of claim 1 wherein the notification stream generator is configured to:
    for each per-tenant segment, establish an exclusive synchronization stream for communication of the set of tenant changes in the per-tenant segment to the corresponding server instance, until the corresponding server instance makes all of the requested changes in the per-tenant segment, the exclusive synchronization stream being exclusive of synchronization streams that communicate other tenant changes, other than the tenant changes in the per-tenant segment.

4. The computer system of claim 1 wherein the notification stream generator comprises:
    a pending change store,
    wherein the change segmentation component is configured to segment of the received change requests into the per-tenant segments and store the per-tenant segments in the pending change store.

5. The computer system of claim 4 wherein each of the notified server instances maintains the connection with the notification stream generator and pulls the changes from a given per-tenant segment, corresponding to the set of change requests for which it was notified, until all changes from the given per-tenant segment have been pulled.

6. The computer system of claim 5 wherein the notification stream generator notifies each given server instance by providing the given server instance with a bookmark corresponding to a per-tenant segment in the pending change store.

7. The computer system of claim 6 wherein the given server instance enforces resource usage constraints, in pulling and making the change requests, on an individual server instance basis.

8. The computer system of claim 7 wherein, for each additional set of change requests received from an additional requesting tenant, the notification stream generator notifies an additional server instance to process the additional set of change requests.

9. The computer system of claim 8 wherein each of the server instances comprises:
    a server instance implemented on a separate physical server.

10. A computer system, comprising:
    a multi-tenant system that serves a plurality of different tenants and maintains separate, isolated tenant data for each of the different tenants, the multi-tenant system comprising:
        a plurality of different servers that process tenant changes in tenant data; and a notification stream generator configured to receive the tenant changes from corresponding, requesting tenants, the notification stream generator comprising a change segmentation component configured to segment the received tenant requests into per-tenant segments, each per-tenant segment corresponding to a particular one of the requesting tenants and comprising a set of change requests indicative of changes to the tenant data corresponding to the particular requesting tenant, the notification stream generator configured to assign a server, of the plurality of different servers, to each requesting tenant to process tenant changes in the corresponding per-tenant segment, the assigned server processing all tenant changes in the per-tenant segment for the corresponding tenant to which the server is assigned before the notification stream generator assigns the server to process tenant changes for another tenant.

11. The computer system of claim 10 wherein the plurality of different servers comprise a plurality of different server instances.

12. The computer system of claim 10 wherein the notification stream generator is configured to:

for each per-tenant segment, establish an exclusive synchronization stream for communication of the set of tenant changes in the per-tenant segment to the corresponding server instance, until the corresponding server instance makes all of the requested changes in the per-tenant segment, the exclusive synchronization stream being exclusive of synchronization streams that communicate other tenant changes, other than the tenant changes in the per-tenant segment.

13. The computer system of claim 10 wherein the server assigned to the requesting tenant pulls the tenant changes form the segment corresponding to the requesting tenant and makes the tenant changes in the tenant data corresponding to the requesting tenant, and notifies the notification stream generator when all the tenant changes from the segment have been made to the tenant data corresponding to the requesting tenant.

14. The computer system of claim 10 and further comprising:

a pending change store that stores the sets of tenant changes.

15. The computer system of claim 14 wherein the change segmentation component segments the sets of tenant changes in the pending change store.

16. The computer system of claim 10 wherein the multi-tenant system is implemented in a cloud computing architecture.

17. A method, comprising:

receiving, from a first tenant, a first set of tenant changes indicative of requested changes to first tenant data corresponding to the first tenant in a multi-tenant system;

receiving, from a second tenant, a second set of tenant changes indicative of requested changes to second tenant data corresponding to the second tenant in the multi-tenant system;

establishing a first exclusive synchronization stream for communication of the first set of tenant changes to a first server in the multi-tenant system, until the first server makes all of the requested changes in the first set of tenant changes, the exclusive synchronization stream being exclusive of synchronization streams that communicate other sets of tenant changes, other than the first set of tenant changes; and establishing a second exclusive synchronization stream for communication of the second set of tenant changes to a second server in the multi-tenant system, until the second server makes all of the requested changes in the second set of tenant changes, the exclusive synchronization stream being exclusive of synchronization streams that communicate other sets of tenant changes, other than the second set of tenant changes.

18. The method of claim 17 and further comprising:

storing, with a notification stream generator, the first set of tenant changes in a first segment in a pending changes data store, the first segment containing tenant changes for only the first tenant; and storing, with the notification stream generator, the second set of tenant changes in a second segment in the pending changes data store, the second segment containing tenant changes for only the second tenant.

19. The method of claim 18 wherein establishing the first exclusive synchronization stream comprises:

maintaining a first connection between the first server and the notification stream generator, until the first server makes all of the requested changes received from the first tenant, indicated by the first set of tenant changes, and thereafter, releasing the first server from the first connection so the first server can be notified of additional sets of tenant changes for other tenants.

20. The method of claim 18 and further comprising:

scaling the multi-tenant system to process requested changes from additional tenants by adding additional servers to the multi-tenant system.

* * * * *